Patented Sept. 25, 1951

2,569,425

UNITED STATES PATENT OFFICE 2,569,425

METHOXY-ETHYL ESTERS OF IMIDO ACIDS

Richard O. Norris, Chicago, Ill., assignor to Sinclair Refining Company, New York, N. Y., a corporation of Maine No Drawing. Application December 30, 1947, Serial No. 794,820

8 Claims. (Cl. 260—453)

This invention relates to new imido esters of alpha halo-nitriles with 2-methoxyethanol and the method for producing these compositions. It further relates to new methoxyethyl esters of alpha halo-carboxylic acids, which may be produced by acid hydrolysis of the corresponding imido esters.

The new imido esters may be described as esters of alpha halo-propionimidic acids and of alpha halo-butyrimidic acids with 2-methoxyethanol. These imido esters are produced by a method which includes reacting 2-methoxyethanol with an appropriate alpha halo lower aliphatic nitrile in an alkaline environment. The available nitriles include those alpha halopropionitriles having 1 to 3 halogen substituents in the propionyl chain and those alpha halo-butyronitriles having 1 or 2 halogen substituents in the butyryl chain. It has been found that a pH in the neighborhood of 9.5 particularly favors the condensation reaction, while with a materially higher pH decomposition predominates. It is noteworthy that the reaction takes place with 2,2,3-trichloropropionitrile, but with higher chlorinated nitriles and the trichlorobutyronitriles the reaction is incomplete or is marked by side reactions. Polymer formation also tends to increase as the number of chlorine substituents increases. The new imido esters are useful as process intermediates in the formation of a wide range of compounds. For example hydrolysis of the new imido esters in the presence of an acid yields corresponding alpha halo-carboxylic acids, which have value as solvents and plasticizers.

In producing the new imido nitriles 2-methoxyethanol may be brought advantageously to a pH of the order of 9.5 by adding approximately 5 parts of sodium cyanide or sodium carbonate or other alkaline material per 93 parts of 2-methoxyethanol. By comparison, 5 parts of sodium cyanide in 80 parts of 95% aqueous ethanol has a pH of 10.9 to 11.0, and 5 parts of sodium cyanide in 100 parts of water has a pH of 11.0. A large excess of 2-methoxyethanol is conveniently employed serving both as solvent and reactant. If the alpha halo-propionitrile or alpha halo-butyronitrile is added to the mixture, the temperature may be conveniently controlled through the rate of addition. The reaction temperature is varied from approximately room temperature to moderate temperatures in the neighborhood of 125–150° C. according to the starting alpha halo-nitrile. The following examples will illustrate the new invention. In these data the use of alpha chloronitriles is described, but other alpha halo-nitriles are suitable. Parts in these examples are parts by weight.

*Example 1.*—Two hundred and thirty-three parts of 2-methoxyethanol were placed in a reactor fitted with an agitator and a reflux condenser. 12.5 parts of sodium cyanide was added. The temperature was controlled at 80–85° C., while 90 parts of 2-chloropropionitrile were added. The reaction mixture was fractionated by distillation and the methoxyethyl ester of 2-chloropropionimidic acid was recovered in a 73.2% yield. The physical constants and analysis of this product follow: B. P., 80°–84° C. at 3 mm. Hg; $n_D^{20}$, 1.4892; $d_4^{20}$, 1.062; percent N 8.6; percent Cl, 20.6.

*Example 2.*—In a similar manner, 104 parts of 2-chlorobutyronitrile were added to the same quantity of the same solution of sodium cyanide in 2-methoxyethanol, and the temperature was controlled at 70° C. The methoxyethyl ester of 2-chlorobutyrimidic acid was recovered by fractional distillation in a yield of 93%. Its physical constants and analysis follow: B. P., 96–98° C. at 18 mm. Hg; $n_D^{20}$, 1.4472; $d_4^{20}$, 1.029; percent N 7.8; percent Cl 18.81.

*Example 3.*—One hundred and sixty-four parts of 2,2-dichloropropionitrile were added to the same quantity of the same solution of sodium cyanide in 2-methoxyethanol, and the temperature was controlled at 125° C. The methoxyethyl ester of 2,2-dichloropropionimidic acid was recovered by fractional distillation in a yield of 82%. Its physical constants and analysis follow: B. P. 108°–110° C. at 25 mm. Hg; $n_D^{20}$, 1.4593; $d_4^{20}$, 1.2079; percent N 7.4; percent Cl 34.71.

*Example 4.*—Likewise, 138 parts of 2,2-dichlorobutyronitrile were added to the same quantity of the same solution of sodium cyanide in 2-methoxyethanol and the reaction temperature was controlled at 125° C. The methoxyethyl ester of 2,2-dichlorobutyrimidic acid was recovered by fractional distillation in a 66% yield. Its physical constants and analysis follow: B. P., 90°–92° C. at 5 mm. Hg; $n_D^{20}$, 1.4592; $d_4^{20}$, 1.1781; percent N 6.6; percent Cl 32.76.

*Example 5.*—2,3,3-trichloropropionitrile in the amount of 160 parts was added to the same quantity of the same solution of sodium cyanide in 2-methoxyethanol and the reaction temperature was maintained at 20° C. The methoxyethyl ester of 2,3,3-trichloropropionimidic acid was recovered by fractional distillation in a yield of 42%. Its physical constants and analysis follow: B. P. 110°–112° C. at 5 mm. Hg; $n_D^{20}$, 1.4776; $d_4^{20}$, 1.3150; percent N 6.4; percent Cl 45.36.

*Example 6.*—2,2,3-trichloropropionitrile in the amount of 138 parts was added to the same quantity of the same solution of sodium cyanide in 2-methoxyethanol, and the reaction temperature was maintained at 20° C. The product was highly polymeric in nature.

The new imido esters are hydrolyzed to the free alpha halo-propionic and alpha halo-butyric acids in the presence of a strong alkali. However, if the new imido esters are hydrolyzed in the presence of an acid, methoxyethyl esters of the alpha halo-propionic and alpha halo-butyric acids are produced. These esters constitute a group of new products having value as solvents and plasticizers. The following esters produced by acid hydrolysis of the above-mentioned imido esters are illustrative: methoxyethyl ester of 2-chloropropionic acid, methoxyethyl ester of 2-chlorobutyric acid, methoxyethyl ester of 2,2-dichloropropionic acid, methoxyethyl ester of 2,2-dichlorobutyric acid, methoxyethyl ester of 2,2,3-trichloropropionic acid.

The production of these methoxyethyl esters will be illustrated by the method of producing the methoxyethyl ester of 2,2-dichloropropionic acid. To a 20% aqueous solution of hydrochloric acid, 10 parts by weight of the methoxyethyl ester of 2,2-dichloropropionimidic acid were added, and the temperature was controlled at 5°–10° C. There was an immediate precipitation of a white solid which was filtered off and dried several times with ether. The filtrate was extracted with ether, dried, and then fractionated by distillation. The solid was identified as ammonium chloride. The methoxyethyl ester of 2,2-dichloropropionic acid was recovered as the liquid fraction boiling at 110°–113° C. at 26–27 mm. of pressure, and having a refractive index of 1.4316 at 30° C.

I claim:

1. Imido esters of lower aliphatic alpha chloroimidic acids selected from the class consisting of the esters of alpha chloro-propionimidic acids of not more than 3 chlorine substituents and alpha chloro-butyrimidic acids of not more than 2 chlorine substituents with 2-methoxyethanol.

2. Methoxyethyl esters of alpha-chloropropionimidic acids having not more than 3 chloro substituents in the propionyl chain.

3. Methoxyethyl ester of 2,2-dichloropropionimidic acid.

4. Methoxyethyl esters of alpha-chlorobutyrimidic acids having not more than 2 chloro substituents in the butyryl chain.

5. The method of producing imido esters which includes reacting 2-methoxyethanol with a lower aliphatic alpha chloro-nitrile selected from the class consisting of alpha chloro-propionitriles of not more than 3 chlorine substituents and alpha chloro-butyronitriles having not more than 2 chlorine substituents in an alkaline environment of about 9.5 pH.

6. The method of producing imido esters which includes reacting 2-methoxyethanol with a lower aliphatic alpha chloro-nitrile selected from the class consisting of alpha chloro-propionitriles of not more than 3 chlorine substituents and alpha chloro-butyronitriles having not more than 2 chlorine substituents in the presence of sodium cyanide in an amount of approximately 5 parts by weight per 93 parts by weight of the 2-methoxyethanol.

7. The method of producing methoxyethyl esters of alpha-chloropropionimidic acids which includes reacting 2-methoxyethanol with an alpha-chloropropionitrile having not more than 3 chloro substituents in the propionyl chain in an alkaline environment of about 9.5 pH.

8. The method of producing methoxyethyl esters of alpha-chlorobutyrimidic acids which includes reacting 2-methoxyethanol with an alpha-chlorobutyronitrile having not more than 2 chloro substituents in the butyryl chain in an alkaline environment of about 9.5 pH.

RICHARD O. NORRIS.

REFERENCES CITED

The following references are of record in the file of this patent:

UNITED STATES PATENTS

| Number | Name | Date |
|---|---|---|
| 1,851,040 | Fikentscher et al. | Mar. 29, 1932 |
| 2,091,267 | Eckelmann et al. | Aug. 31, 1937 |
| 2,257,021 | Pollack | Sept. 23, 1941 |
| 2,342,590 | Lichty | Feb. 22, 1944 |
| 2,385,290 | Lichty | Sept. 18, 1945 |
| 2,400,463 | Lichty | May 14, 1946 |
| 2,405,894 | Lichty | Aug. 13, 1946 |

OTHER REFERENCES

Migrdichian: "The Chemistry of Organic Cyanogen Compounds," ACS Monograph No. 105 (1947), page 86.